Figure 1:
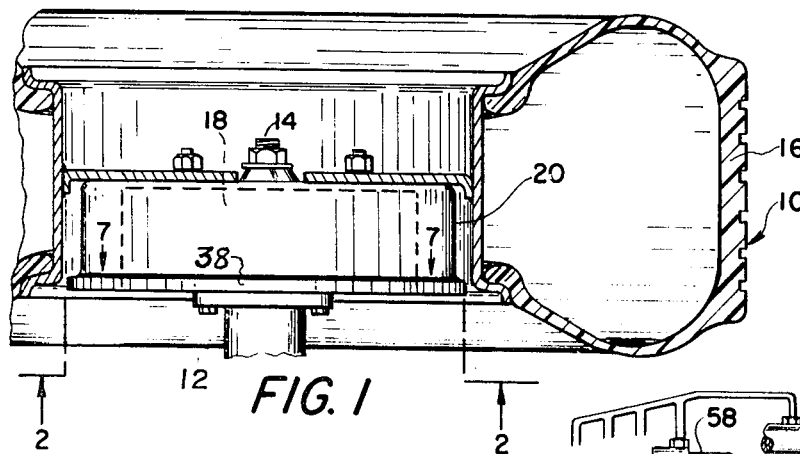

United States Patent

[11] 3,608,980

| [72] | Inventor | Walter S. Pawl<br>2844 Powder Mill Road, Adelphi, Md. 20783 |
|---|---|---|
| [21] | Appl. No. | 806,344 |
| [22] | Filed | Feb. 25, 1969 |
| [45] | Patented | Sept. 28, 1971 |

[54] ANTISKID AND ANTISPIN DEVICE
2 Claims, 8 Drawing Figs.

| [52] | U.S. Cl. | 303/21, 188/181 |
|---|---|---|
| [51] | Int. Cl. | B60t 8/12 |
| [50] | Field of Search | 303/6, 24, 21, 61–63, 68–69; 188/181 |

[56] References Cited
UNITED STATES PATENTS

| 2,698,021 | 12/1954 | Bricker et al. | 188/181 X |
| 2,827,137 | 3/1958 | Lockheed | 188/181 |
| 2,892,660 | 6/1959 | Reswick et al. | 188/181 X |
| 2,907,607 | 10/1959 | Williams | 303/21 |
| 2,933,161 | 4/1960 | Hebberling et al. | 188/181 |

*Primary Examiner*—Milton Buchler
*Assistant Examiner*—John J. McLaughlin

ABSTRACT: This invention comprises a means for detecting the point at which the braking wheel begins to skid or the driving wheel begins to spin, by using circumferential accelerometers mounted on the wheels to indicate the initiation of a skid or spin by an inertial displacement of each of the accelerometer weights as it passes the bottom of its rotation as the wheel starts to decelerate or accelerate its rotation faster than the resulting deceleration or acceleration of the vehicle, or is actually locked while the vehicle is still in motion, or is spinning while the vehicle is motionless. This displacement is used to control means for reducing the maximum brake pressure or the maximum power that may be applied to a maximum that the instant conditions of load, tire and road characteristics will permit without causing skidding or spinning of the particular wheel on which the accelerometers are mounted. Thus, by having the maximum pressure that may be applied to the brakes on each wheel, separately and automatically limited in this manner to get the maximum braking without skidding, a safe stop can be made even under the most hazardous conditions, in the shortest distance possible. Likewise, by having the maximum power applied, automatically limited in the same manner to get maximum acceleration, a fast spurt to the desired speed can be safely and most speedily accomplished, even under adverse road conditions.

PATENTED SEP 28 1971

3,608,980

SHEET 1 OF 2

INVENTOR
Walter S. Pawl.

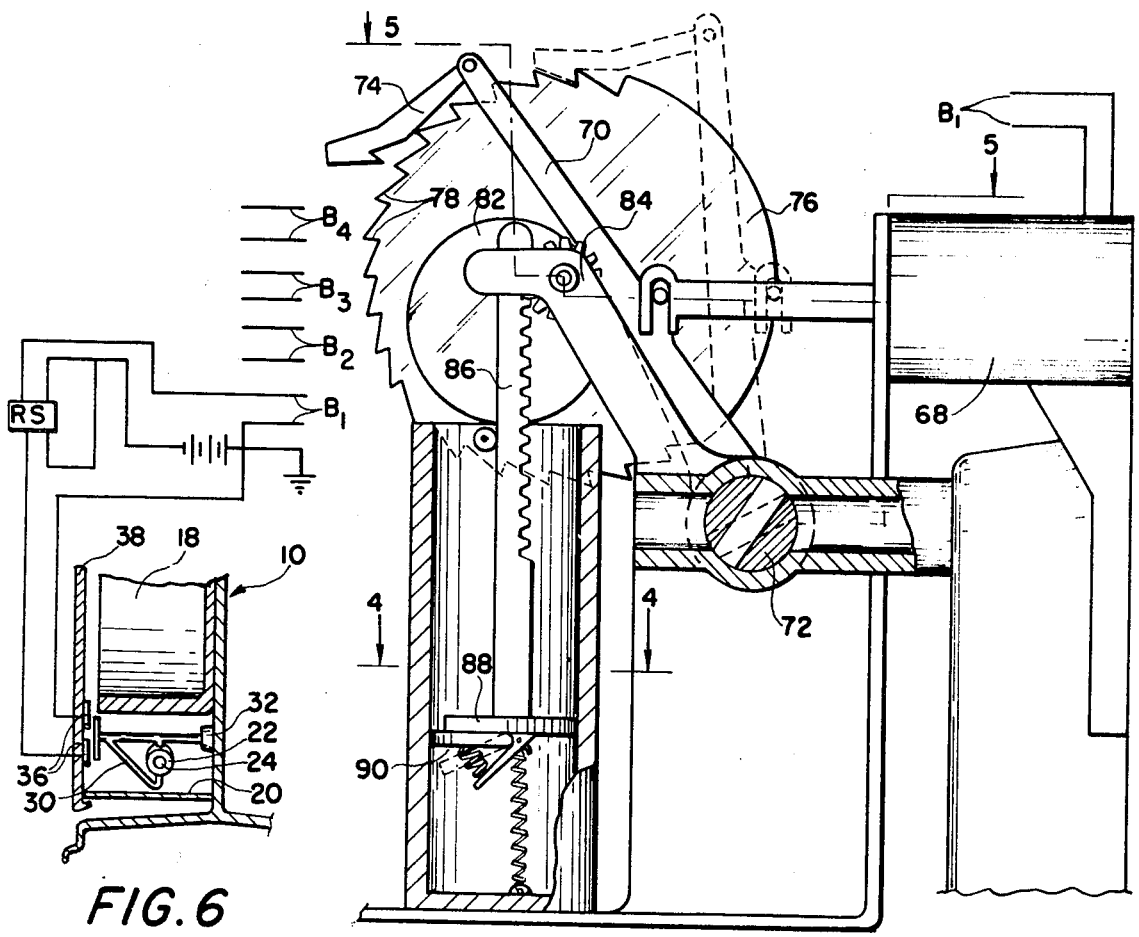
FIG. 6
FIG. 3
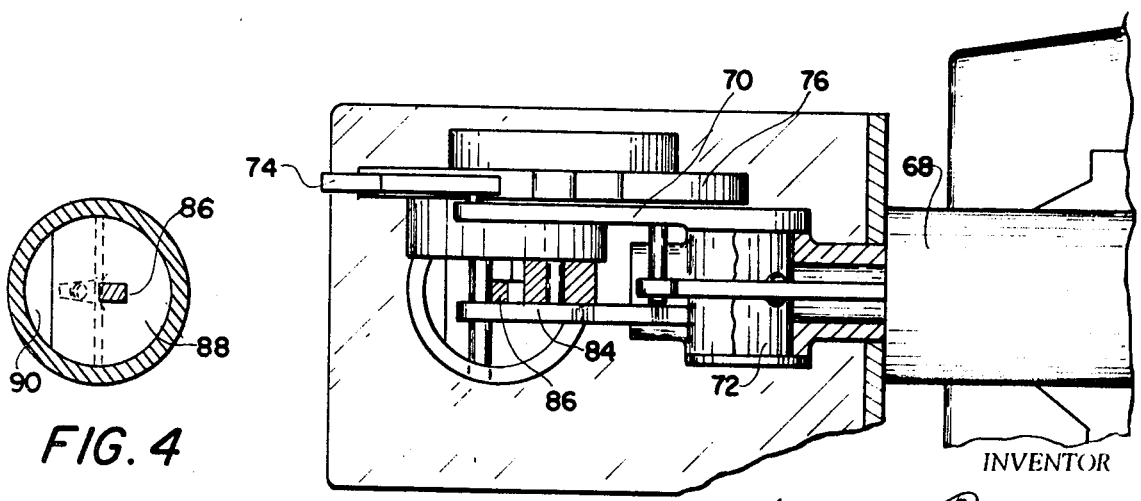
FIG. 4
FIG. 5
INVENTOR
Walter S. Paul

ANTISKID AND ANTISPIN DEVICE

Many and various devices have been and are being developed, using means responsive to the difference in speed of the car and its wheel rotation, as well as other means to detect skidding or spinning and to accordingly maintain a reduced braking pressure or power torque to eliminate the skidding or spinning. These methods generally involve very complex devices, sometimes including an auxiliary tracking wheel to measure actual ground speed, etc.

None of these methods have been found to be very effective in shortening the stopping or desired speed attaining distance, because of time delays in detection as well as elimination of the skid or spin, and in unnecessarily reducing the brake pressure or power applied below the maximum no-skid pressure or no-spin torque.

The present device is simple and is adaptable to any systems of brake pressure and power application, in the operation of motor vehicles of any type. It is illustrated in connection with a system of the Hemphill type for automobiles such as disclosed in U.S. Pat. No 2,871,999.

The object of this invention is to prevent skidding of a vehicle having controlled pressure brakes, when a stop is required within the shortest distance possible, as in an emergency stop, to avoid a collision with a pedestrian, another vehicle or other obstruction.

Another object is to provide a simple antiskid device for vehicles with fluid pressure operated wheel brakes.

A further object is to use an accelerometer or accelerometers mounted circumferentially on a vehicle brake wheel having a brake pressure control for applying maximum pressure thereto, so that they will be responsive to any excess of rotational over linear inertias of the wheel upon loss of static friction thereof with the road, to cause the operation of means to limit said maximum pressure by reducing it a small amount at each such response until said static friction is restored followed by a gradual restoration of the brake pressure toward its original maximum unless static friction is again lost for an instant as above.

A further object is to mount a plurality of circumferentially spaced accelerometers symmetrically around the outside of a wheel brake drum, each provided with a trolley lever operated by displacement of the accelerometer weight from its normal position, to project the trolley against a stationary arcuate trolley wire portion mounted adjacent the bottom of the wheel for closing a control circuit for operation of a pressure limiting means for limiting the maximum brake pressure that may be applied without causing traction or wheel skidding.

A further object is to use the same control circuit on the drive wheels of the vehicle, by switching it over, to operate a power control limiting means on the throttle of the driving engine, to maintain the highest permissible acceleration of the vehicle that will not cause kinetic traction or wheel spinning.

Figure 2:
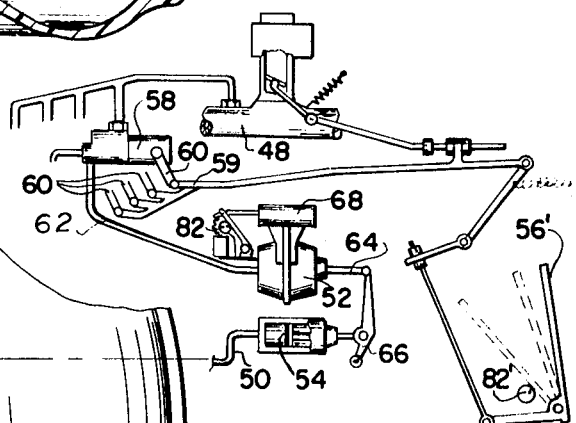
Figure 2:
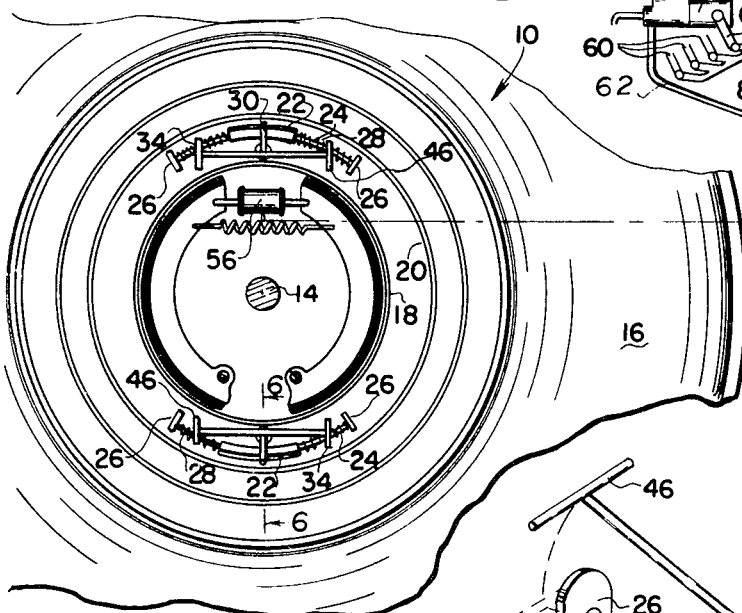
Figure 8:
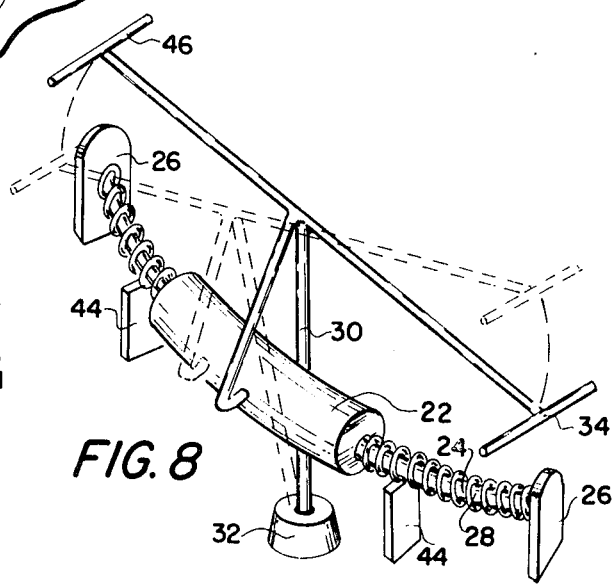
Figure 7:
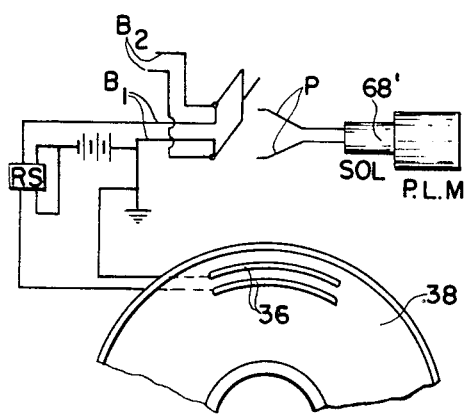

Other and more specific horizontal will become apparent in the following detailed description of the present invention as illustrated in the accompanying drawing, wherein:

FIG. 1 is a horizontal sectional view of a mounted vehicle wheel, over the top of the brake drum and accelerometer and axle housings, FIG. 2 is an elevational inside view of the wheel taken on the line 2—2 in FIG. 1, and a diagrammatical illustration of the power controls and fluid pressure system connected thereto, FIG. 3 is an enlarged detail view of the fluid pressure limit controls, partly in section, FIG. 4 is a detail sectional view taken on the line 4—4 in FIG. 3, FIG. 5 is a plan view, partly in section taken on the line 5—5 in FIG. 3, FIG. 6 is a sectional detail in view taken on the line 6—6 in FIG. 2, showing diagrammatically the solenoid operating circuit, FIG. 7 is a detail view of a portion of the cover plate fixed to the axle housing and showing the trolley wire portion on the inner face thereof, also showing the trolley wire portion on the inner face thereof, also showing diagrammatically how a double throw switch may be used to selectively connect the control circuits of two drive wheels to a common power limiting control means, and FIG. 8 is an enlarged perspective view of the trolley lever, showing the double armed trolley for responding to displacement of the accelerometer weight in either direction.

It is to be noted that the vertical axial plane element of a vehicle wheel in motion is in static friction with the ground during vehicle acceleration or deceleration only under no-skid or no-spin rolling traction thereover; i.e. as long as the rotational deceleration of this element at any point directly below the axis of the wheel does not exceed the deceleration of the vehicle as the braking pressure increases. Static traction is likewise maintained during acceleration of the wheels only so long as the acceleration of the wheel rotation does not exceed the vehicle acceleration.

The present device immediately senses the skid or spin by the displacement of the accelerometer weights from normal position as they approach the bottom of their rotation. Their displacement at this point actuates the double armed trolley to close the solenoid operating circuit and rapidly reduces the brake pressure to restore static friction between the wheel and the ground and lets the pressure gradually build up so as to get the benefit of the greatest pressure that will not lose that static friction, even under continually changing road conditions. The trolleys, are similarly actuated when spin occurs during driving acceleration to reduce the power applied and restore static friction, while always gradually returning to maximum power so as to permit a maximum torque just short of causing the drive wheels, or any one of the drive wheels to spin.

In starting or stopping, obvious advantages will thus be obtained by the use of the present device, including 1. Increased safety.
2. Less tire wear.
3. Better directional stability.
4. Comfort, reliability, economy, etc.

Referring now to the drawings, an automobile wheel 10 is shown in FIG. 1, mounted over the end of a rear axle housing 12 on shaft 14. It has a tire 16 and brake drum 18 and shield 20 housing a pair of accelerometers around the drum, as shown. Each accelerometer comprises a weight 22 slidably mounted on circumferential bar 24 which is fixed to the wheel on supports 26 at its ends. Balanced springs 28 hold the weight 22 normally in the center of the bar. A trolley lever 30 is pivotally mounted on the weight 22 and has its inner end pivoted in socket bearing 32 so that upon any circumferential displacement of the weight 22, from its normally central position on the bar, as it passes the vertical axial plane of the wheel at the bottom of its rotation therewith, the lever 30 will be actuated to project the trolley 34 or 46 outwardly against the trolley wires 36 which are mounted on a peripherally extended portion of the normal cover plate 38 on which the brake shoes 40 are usually mounted and which extends from the axle housing to cover the brake drum opening and the opening of the accelerometer shield 20 around the brake drum.

The weight 22 may be provided with rollers bearing on opposite sides of the bar 24 to reduce the sliding friction of the weight thereon as it responds to the changing inertia forces thereon during acceleration or deceleration of the wheel. Only a slight displacement of the weight is required to move the trolley lever 30 far enough to project the conductive trolley 34 or 46 out against the wires 36, and a stop member 44 may be fixed to the drum as shown to prevent too much unnecessary displacement of the weight from its normal central position.

The trolleys 34 and 46 are mounted on arms extending from the lever 30 in opposite directions and the trolley 46 is projected outwardly in response to the unbalance between rotational and linear inertias of the corresponding weight 22 to close the circuit to prevent skidding when applying maximum brake pressure while driving in reverse, or to prevent spinning of the wheels while applying maximum power in forward drive, just as the trolley 34 is projected in a similar manner to close the circuits to prevent skidding while driving forwardly or to prevent spinning of the drive wheels while driving in reverse.

The two accelerometers shown are placed on opposite sides of the wheel axis for dynamic balance. However, any other plurality of accelerometers may be used to provide more frequent corrections of the limit controls of either the maximum brake pressure or the power applied, as the case may be; but in each case, these accelerometers should be symmetrically distributed around the wheel axis to prevent dynamic imbalance.

Although the brake system with which this accelerometer device is connected for purposes of illustrating the operation of this invention is of the Hemphill type, it is similarly applicable to any other braking system where the full brake pressure may be controlled to reduce it in small increments and continuously restored therebetween, so that the highest pressure is substantially maintained which will not produce skidding. It is likewise applicable to any other power application system where the full power control may be reduced rapidly by small increments and gradually restored between these reductions so that the highest power is continuously applied which will produce substantially no spinning.

As shown in the drawings, the liquid pressure line 50 transmits the brake pressure from the power booster 52, which actuates the piston 54, to the brakes through the opposed plungers in unit 56 whenever the accelerator foot pedal 56' is released into the brake control range. This is so because intake vacuum from the intake manifold 48 is applied by operation of the valve 58 through its control lever 60, to the booster chamber on its near side of the diaphragm (not shown) in the booster by way of the line 62, and the diaphragm being connected by rod 64 to the lever 66, actuates piston 54 to provide the brake pressure in accordance with the control of the valve 58.

The illustration in the drawings shows a gang control rod 59 for four of these valves, one for each of four individual brake pressure systems for a vehicle with 4-wheel brakes, each individual brake system operating independently of the others, in limiting the brake pressure on their respective wheels in the same way as the one shown.

The solenoid terminals $B_1$, $B_2$, $B_3$, and $B_4$ of the independent control circuits for each wheel are shown diagrammatically in FIG. 6, and each circuit, like the one having the solenoid terminals B, includes the relay switch RS actuated by the projection of the respective trolley 34 or 46 against the trolley wires 36 at the initiation of any skid, to close the relay switch circuit which in turn closes the solenoid circuit, the leads $B_1$ of which are connected to the brake solenoid 68. This solenoid provides impulses to lever 70 for opening the bleed valve 72 which is connected to the booster chamber to instantly lower the brake pressure sufficiently to regain static traction, i.e. static friction of the corresponding wheel tread on the road; at the same time the hook lever 74 which is pivoted to the end of lever 70, latches on to the ratchet gear 76 to move it through an arc equivalent to the span of one tooth 78. The spring in the solenoid immediately returns the lever 70 to rest against the cylindrical stop cam 82 which is eccentrically mounted on gear 76 and carries a gear 84 fixed thereto axially of gear 76, so that successive impulses of solenoid 68 will further move the cam 82 to stop the lever 70 at an increased opening of the bleed valve 72 so as to reduce the brake pressure sufficiently to avoid skidding, and the gear 84 will raise the tooth rack 86 which is connected to the plunger 88 which is damped in its downward movement by a segmental valve 90 so as to gradually return the cam 82 between impulses toward a higher brake pressure limit position. Thus the system automatically adjust itself substantially continuously toward a maximum brake pressure position under which no skid occurs, assuring a maximum static friction of the wheel treads on the road regardless of the conditions of the road surface or any changes therein, in the event a shortest stopping distance is required as in a panic stop. Otherwise, the brakes may be operated normally to control the speed of the vehicle as desired.

In reverse driving, the brake system controls will operate in the same manner in an emergency stop, except that the circuits will be actuated in response to the projection of the opposite trolleys 46, since the displacement of the weights 22 will be in the reverse direction upon sensing any skidding of the corresponding wheels.

When these circuits are used to control the power applied for maximum no-spin acceleration, obviously, the solenoid circuits of only the drive wheel circuits will be effective in limiting the maximum applied power, and may be connected in parallel to operate one solenoid 68 for operating the engine throttle limiting means, including the cam 82', to limit the power applied similarly to operating the bleed valve limiting means for limiting the brake pressure.

Many obvious modifications in the details and arrangement of parts of this disclosure may be made without departing from the spirit and scope of this invention. For example, the individual wheel circuits may each have an individual switch for switching the solenoid terminals of only the driving wheels in parallel to a single throttle limiting control solenoid 68', in order to make a quick start as shown in FIG. 7; and the relay switch circuit of each brake wheel may be switched to its individual solenoid 68 at all times except while making a quick getaway.

Furthermore, while this invention is shown in a specific form in this disclosure, it is to be understood that the invention is not to be limited thereby in any way, but includes its application to any type of wheeled vehicle for providing a no-skid and no-spin device for the wheels which have means in the vehicle for increasing the rate of speed change of said wheels at controlled maximum limits when required, while the vehicle is driven in either the forward or reverse direction, during quick stops or quick getaways where these maximum limits are automatically substantially continuously maintained at a value below that which would initiate kinetic road friction under the instant traction conditions, and which provides static road friction at the maximum rates of speed change possible.

The principle upon which this device operates is based on the fact that the accelerator weights remain in normal central position, as they pass the vertical below the wheel axis, only under static traction conditions during either acceleration or deceleration of the vehicle. Under these conditions, as they pass the vertical below the axis, their horizontal component of rotational inertia is equal and opposite to their linear inertia as a part of the vehicle of which the wheel is a part. However, if their rotational inertia exceeds their linear inertia at this point, indicating a loss of static traction, an imbalance occurs, causing the weight to be displaced from its central balanced position. Thus the trolley is projected to contact the trolley wires at this point and completes the circuit which actuates the solenoid to provide the impulses which cause static friction conditions to be instantly regained while providing a damped return between these impulses to the maximum static friction conditions so as to substantially continuously maintain said maximum static friction during panic stops or quick spurts.

What is claimed is:

1. A no-skid brake control device for a wheeled vehicle having brake control means for increasing the brake pressure applied to each brake wheel to a maximum which will preserve static friction between said wheel tread and the road surface, in an emergency, at any speed in either forward or reverse drive comprising sensing means mounted on the rotatable portion of each brake wheel and having a movable indicator responsive to any imbalance between the rotational and linear inertias of said wheel at its road contact, said imbalance being caused by the application of excessive brake pressure, indicating a loss of static friction between the wheel tread and the road surface, and means in said vehicle responsive to said movement of said indicator for instantly seeking an adjustment of said brake pressure to a maximum which will preserve static friction of said wheel under varying road conditions throughout substantially the entire braking distance, said sensing means comprising a weight slidably mounted in a centrally biased position for circumferential displacement in response to inertia forces acting thereon, a stationary face plate mounted on said vehicle adjacent the path of said weight and having exposed trolley wires insulatedly mounted on the adjacent face of said plate at substantially the same radius below the axis of said wheel, a trolley adapted to be projected from the wheel by displacement of said weight in the direction of wheel rotation and to contact said trolley wires, and an electrical circuit in said vehicle completed by said contact for operating said brake pressure adjustment seeking means.

2. A no-skid brake control device as defined in claim 10, said brake pressure adjustment seeking means comprising a control lever for reducing the maximum brake pressure applied, to substantially zero, a stop means against which said lever is normally biased to return toward its maximum brake pressure position, a solenoid energized in response to the movement of said indicator for operating said lever through its full range and for advancing the stop means by a step at each such operation to stop the lever at successively lower brake pressure position, said stop means being normally biased and having damping means to provide its gradual return to its maximum brake pressure position.